United States Patent [19]
Huntington

[11] 3,834,662
[45] Sept. 10, 1974

[54] DAMPER

[75] Inventor: Robert G. Huntington, Louisville, Ky.

[73] Assignee: American Air Filter Company, Inc., Louisville, Ky.

[22] Filed: May 31, 1972

[21] Appl. No.: 258,275

[52] U.S. Cl. .................................................. 251/121
[51] Int. Cl. ............................................. F16k 47/00
[58] Field of Search ....... 55/417, 418; 251/120, 121

[56] References Cited
UNITED STATES PATENTS

| | | | |
|---|---|---|---|
| 2,227,895 | 1/1941 | Ferguson .................. | 137/625.3 X |
| 2,341,394 | 2/1944 | Sloan ........................ | 251/120 |
| 2,652,856 | 9/1953 | Welty et al. .............. | 251/120 X |
| 2,683,444 | 7/1954 | Miller ........................ | 55/418 |
| 2,685,294 | 8/1954 | Gold et al. ................ | 251/121 UX |
| 2,951,499 | 9/1960 | Singer ....................... | 251/121 X |
| 3,190,608 | 6/1965 | Hassa ........................ | 251/121 |
| 3,752,439 | 8/1973 | Thomas ..................... | 251/121 |

Primary Examiner—William R. Cline
Assistant Examiner—Gerald A. Michalsky

[57] ABSTRACT

A damper arrangement wherein a damper blade opens and closes a flow through damper port, the damper blade having baffle means attached to its port engaging side, the baffle means providing an opening of constant cross-section with the port during a portion of the stroke of the damper blade to provide a buffered transition when removing a fluid system from or returning a fluid system to full fluid flow, the damper blade additionally having a peripheral flexible portion which provides a positive seal between the blade and a seat surrounding the port.

5 Claims, 2 Drawing Figures

PATENTED SEP 10 1974 3,834,662

3,834,662

DAMPER

BACKGROUND OF THE INVENTION

Frequently, it is desirable to provide for a buffered transition when removing a fluid system from or returning a fluid system to full fluid flow. For example, in the filtering of a gas stream using cloth fabric bags, it is desirable to avoid a sudden surge of gas when a damper is activated to control the gas flow, since sudden surges of gas may cause the fabric filter bags to snap thereby weakening the fabric material and causing other undesirable results. This weakening of the fabric is particularly noticeable when the fabric material contains glass fibers as a component thereof. Because of such snapping, prior art damper arrangements such as Bullseye dampers and Butterfly dampers can only be made to function satisfactorily by using expensive timed actuating means which cause them to operate very slowly. Less objectionable of the two damper arrangements is the Bullseye damper since its flow rate changes linearly over the entire blade stroke. An acceptable method of overcoming fluid surges and consequent bag snapping in Bullseye dampers is to provide a baffle means on the blade of the damper which maintains an opening of constant cross-section during a portion of the stroke of the damper blade and thereby provides a buffered transition when removing a fluid system from or returning a fluid system to full fluid flow. However, such baffle means affixed to the damper blade of a Bullseye damper may have the inherent disadvantage of imparting rigidity to the otherwise flexible damper blade. Such rigidity may be undesirable because the damper blade is advantageously maintained flexible to enhance its seal with its ported valve seat. The present invention provides a straightforward, inexpensive, readily constructed and easily maintained flexible damper blade arrangement which can be used in combination with a baffle means on the blade of a Bullseye damper.

SUMMARY OF THE INVENTION

The present invention provides a damper arrangement which permits a constant flow of fluid therethrough during a portion of the damper blade stroke, and yet, is capable of effecting a positive seal when in its closed position. More specifically, the present invention provides a damper arrangement comprising: a plate having a flow-through port located therein; a port closing blade movably positioned between an open position and a closed position in relation to the port, the blade having a peripheral resilient portion which flexibly engages the edge of the port when in its closed position to form a fluid tight seal therewith; actuating means for moving the blade relative to the plate; and baffle means positioned in cooperative arrangement with the blade and circumscribed by the port to provide a flow-through opening of constant cross-section during a predetermined portion of the blade stroke between its open and closed positions. The damper arrangement of this disclosure has been found to be particularly useful, where, for example, the edge of the flow-through port has become distorted or worn and a flexible damper blade must be used to adequately contact the entire surface area of the port edge to effect a fluid tight seal.

DESCRIPTION OF THE PREFERRED EMBODIMENT

Figure 1:
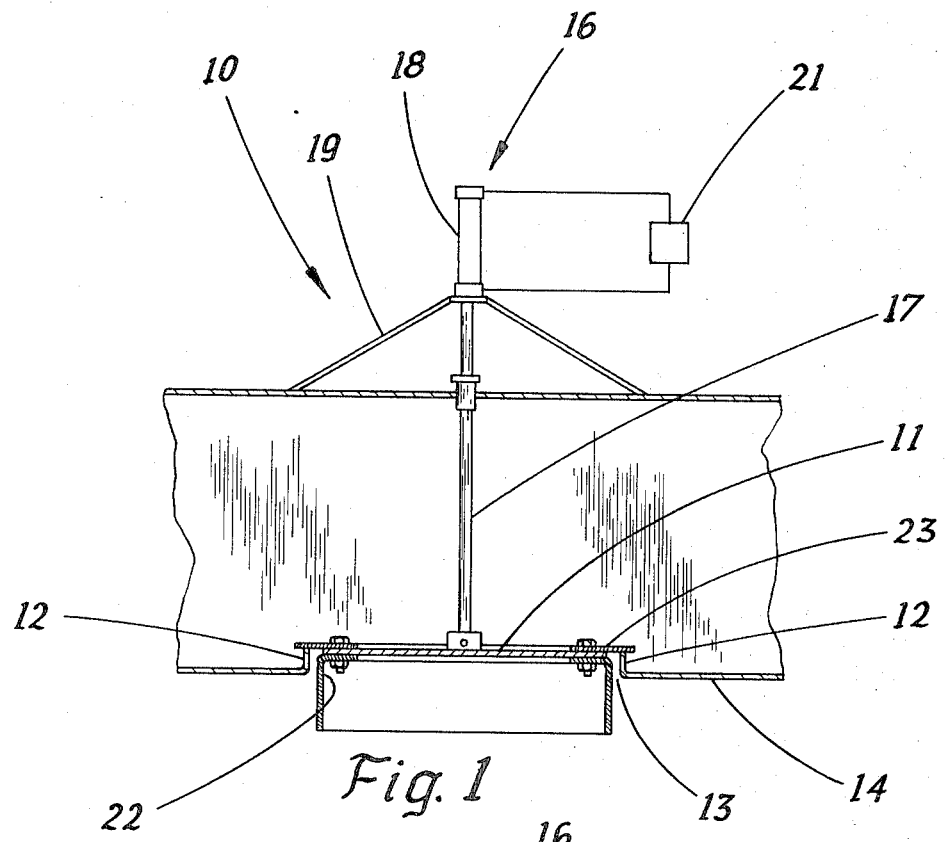
FIG. 1 is an elevational view partially in cross-section of one embodiment of the invention of this disclosure.

In FIG. 1 damper arrangement 10 is shown in a fluid passageway in closed position, having blade 11 in fluid tight relationship with the edge 12 of port 13 in plate 14. Blade 11 is held in position and supported by actuating means 16 which includes shaft 17, cylinder 18, frame 19, and control means 21. Cylinder 18 is generally a hydraulic cylinder actuated by control means 21 and supported by support frame 19 outside of the fluid passageway. Control means 21 is generally a simple switch arrangement which may be selectively operated to open or close damper arrangement 10. During a preselected portion of the blade stroke baffle means 22 is passed through port 13 thereby defining an annular flow-through opening between its sidewall and the edge 12 of port 13. During the initial stages of opening of damper arrangement 10 blade 11 will be moved upwardly from its fluid tight position on edges 12. As this happens baffle means 22 remains in juxtaposition with port 13 and a constant flow of fluid will be allowed to pass through the annular space between baffle means 22 and plate 14 containing port 13.

Baffle means 22 may impart rigidity to blade 11 which is frequently undesirable. To avoid such undesirable rigidity and provide a fluid tight seal a flexible peripheral resilient portion 23 is attached to blade 11. The peripheral resilient portion engages edge 12 of port 13 when damper arrangement 10 is in its closed position thereby effecting a fluid tight seal even if edge 12 is irregular or nonplanar. Thus, a fluid tight seal and a buffered transition are both realized from damper arrangement 10.

Advantageously, port 13, blade 11, and peripheral resilient portion 23 are circular, however it is apparent that other shapes may be used. Correspondingly, baffle means 18 is generally the same shape as blade 11 and port 13 but it is not imperative that such be the case. Similarly, it is not imperative that peripheral resilient portion 23 be the same shape as blade 11 and port 13 as long as peripheral resilient portion 23 contacts edge 12 around the entire periphery of port 13. Additionally, it is advantageous to have peripheral resilient portion 23 concentrically located with respect to port 13 and edge 12, which in turn indicates it would advantageously be centered with respect to blade 11. Again however, concentricity of peripheral resilient portion 23 with port 13 is not strictly imperative and the apparatus of this invention will function acceptably even if peripheral resilient portion 23 is offset with respect to the center of blade 11 or port 13 or both, as long as peripheral resilient portion 23 contacts port 13 around its entire periphery.

Figure 2:
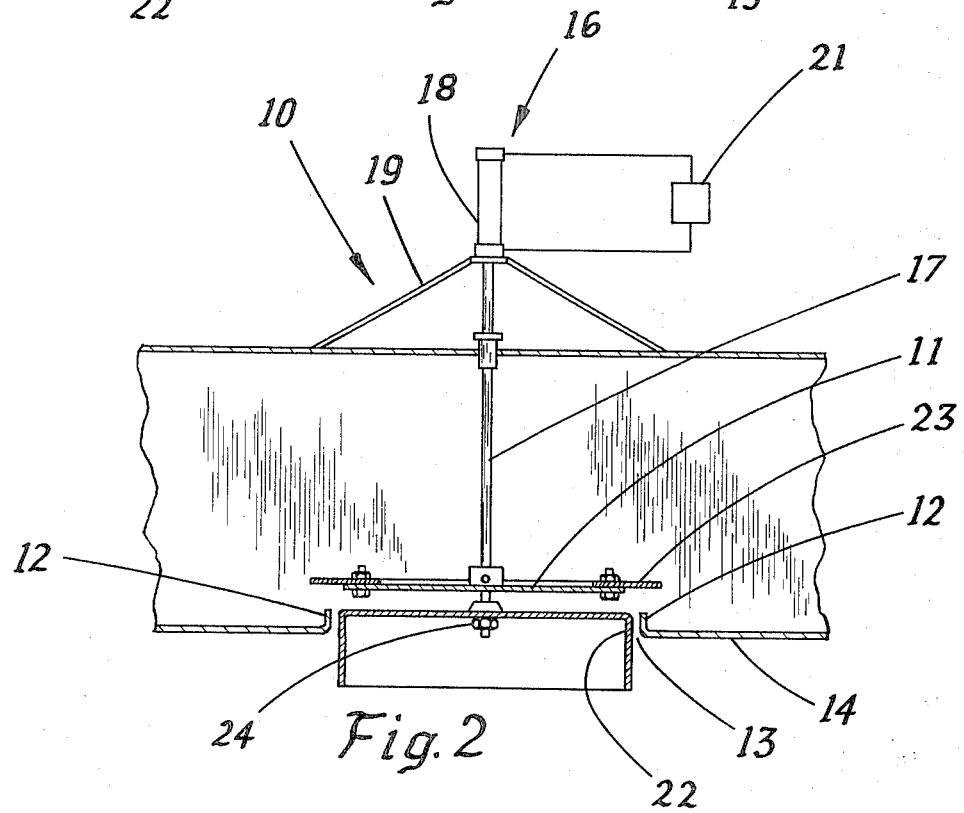
FIG. 2 is an elevational view partially in cross-section of an alternative embodiment of the invention of this disclosure.

FIG. 2 shows an alternative embodiment of the invention of this disclosure which includes attaching baffle means 22, in the form of a skirted disc, axially below blade 11 on shaft 17. Again, damper blade 11 is provided with a peripheral resilient portion 23. Peripheral resilient portion 23 is an annular shaped disc attached to blade 11 by any suitable attaching means such as nuts and bolts. To attach baffle means 22 shaft 17 may be threaded and nut and collar arrangement 24 used. Also advantageously the axial displacement of cylindrical projection 22 from blade 11 is such that the distance between the two is not so great as to destroy the buffered transition effect of baffle means 22 between no flow and full flow. As can be seen from FIG. 2, the operation of this damper arrangement is identical to the operation of the damper arrangement shown in FIG. 1; that is, peripheral resilient portion 23 attached to, or integral with, blade 11 functions to effect a fluid tight seal when the damper arrangement is in its closed position, and upon being opened, baffle means 22 provides a buffered transition between no flow and full flow through port 13.

In the embodiment shown in FIG. 1 it is of course possible to have blade 11 supported and moved from its underside. Correspondingly, cylinder 18, shaft 17, and frame 19 would be located on the underside of blade 11. Such an arrangement is perhaps less preferable in that shaft 17 may obstruct the fluid flow through port 13. However, the function of peripheral resilient portion 23 would be the same. Correspondingly, then, it is also possible in the embodiment of FIG. 2 to support and actuate blade 11 from its underside. Again such an embodiment may result in shaft 17 obstructing the fluid stream flowing through port 13 during the full open position of blade 11. However, the function of peripheral resilient portion 23 and cylindrical projection 22 would be the same. Also, it should be noted that actuating means 16 need not be limited to a hydraulic cylinder 18 and that pneumatic or electro-mechanical or other equivalent actuating means can be used as well.

Having thus described the invention what is claimed is:

1. A damper arrangement comprising: a plate having a flow-through port located therein; a port closing blade movably positioned between an open position and a closed position in relation to said port, said blade having a peripheral resilient flange portion attached thereto and supported thereby at the inner periphery of said flange portion which extends outwardly beyond the outer peripheral edge of said blade in a manner which is flexible in relation to said blade and flexibly engages the port edge when in its closed position to form a fluid tight seal therewith; actuating means for moving said blade relative to said plate; and, fluid impervious baffle means positioned in cooperative arrangement with said blade and circumscribed by said port to provide a flow-through opening, said opening being defined by the edge of said port and said baffle means and of constant cross section during a predetermined portion of the blade stroke between its open and closed position.

2. The apparatus of claim 1 wherein said baffle means is attached to said blade and said peripheral resilient flange portion is attached to said blade to form an outward extension thereof.

3. The apparatus of claim 2 wherein said blade and said baffle means are integral and said peripheral resilient flange portion is attached to form an outward extension of said blade.

4. The apparatus of claim 3 wherein said port is generally circular and said baffle means is a generally cylindrical projection of smaller diameter than said port and spaced generally concentrically to said port and said peripheral resilient flange portion is an annular shaped flexible disc.

5. The apparatus of claim 1 wherein said baffle means is a skirted disc and is located adjacent to but separate from said blade.

* * * * *